United States Patent
Carey et al.

(10) Patent No.: US 7,175,017 B2
(45) Date of Patent: Feb. 13, 2007

(54) IN-LINE FLIPPER MECHANISM AND CONVEYOR SYSTEM FOR ACHIEVING THE PROPER ORIENTATION OF MAIL TRAY AND MAIL TUB RECEPTACLES

(75) Inventors: Patrick J. Carey, Endwell, NY (US); Wayne M. Blackwell, Chenango Forks, NY (US); Bruce A. Williams, Endwell, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 10/872,386

(22) Filed: Jun. 22, 2004

(65) Prior Publication Data

US 2005/0281662 A1 Dec. 22, 2005

(51) Int. Cl.
*B65G 47/24* (2006.01)
(52) U.S. Cl. ...................... 198/412; 198/401
(58) Field of Classification Search ............... 198/395, 198/399, 401, 404, 412; 414/765; 193/47–48
See application file for complete search history.

(56) References Cited

U.S. PATENT DOCUMENTS

| | | | | |
|---|---|---|---|---|
| 3,190,461 A | * | 6/1965 | Postlewaite | ................. 414/765 |
| 3,993,203 A | | 11/1976 | Bartley | |
| 4,089,404 A | | 5/1978 | Venzke | |
| 4,221,520 A | | 9/1980 | Bartley | |
| 4,344,730 A | | 8/1982 | Dvorak | |
| 4,471,823 A | * | 9/1984 | Wadell | .................... 144/248.5 |
| 4,699,564 A | * | 10/1987 | Cetrangolo | ................. 414/765 |
| 5,400,841 A | * | 3/1995 | Holbert | ..................... 144/48.1 |
| 5,622,213 A | * | 4/1997 | McKelvie | ................ 144/246.2 |
| 5,713,713 A | | 2/1998 | Syde et al. | |
| 5,980,191 A | * | 11/1999 | Trible | ...................... 414/746.7 |
| 6,139,243 A | | 10/2000 | Jackson et al. | |
| 6,190,110 B1 | | 2/2001 | Stanley et al. | |
| 6,206,170 B1 | | 3/2001 | Kissel et al. | |
| 6,217,274 B1 | | 4/2001 | Svyatsky et al. | |

* cited by examiner

*Primary Examiner*—Gene O Crawford
*Assistant Examiner*—Mark A. Deuble
(74) *Attorney, Agent, or Firm*—Schwartz & Weinrieb (57) ABSTRACT

An article or postal mail conveyor or transportation system which has an in-line mechanism integrally incorporated therein that has been specifically constructed and assembled so as to enable mail tray and mail tub receptacles, which may initially be disposed upon the conveyor or transportation mechanism in improperly oriented states or dispositions, to be automatically moved to properly oriented dispositions or states such that the mail tray and mail tub receptacles can in fact be processed further by automated apparatus or equipment without encountering or causing operational difficulties. The mechanism for re-orienting the mail trays or mail tubs comprises a four-sided tubular housing within which conveyor rollers are disposed upon the four walls of the tubular housing such that any one of the walls of the tubular housing can effectively serve as the floor member of the housing along which the mail trays or mail tubs can be conveyed. The tubular housing is rotatable either in 90° or 180° modes such that regardless of the degree to which a particular mail tray or mail tub is improperly oriented, the mail tray or mail tub can be properly oriented.

20 Claims, 4 Drawing Sheets

IN-LINE FLIPPER MECHANISM AND CONVEYOR SYSTEM FOR ACHIEVING THE PROPER ORIENTATION OF MAIL TRAY AND MAIL TUB RECEPTACLES

FIELD OF THE INVENTION

The present invention relates generally to article conveyor or transportation systems, specifically, postal mail conveyor or transportation systems, wherein the postal mail pieces or articles are conveyed within mail tub and mail tray receptacles, and more particularly to a new and improved article or postal mail conveyor or transporation system which has an in-line mechanism integrally incorporated therein that has been specifically constructed and assembled so as to enable mail tray and mail tub receptacles, which may initially be disposed upon the conveyor or transportation mechanism in improperly oriented states or dispositions, to be automatically moved to properly oriented dispositions or states such that the mail tray and mail tub receptacles can in fact be processed further by automated apparatus or equipment without encountering or causing operational difficulties, problems, breakdowns, stoppages, or the like, such as, for example, the jamming of the automated apparatus or equipment, or the inadvertent and undesirable discharge of the mail piece contents from the mail tray receptacles, wherein such operational difficulties, problems, breakdowns, stoppages, or the like, such as, for example, the jamming of the automatic equipment or apparatus, or the inadvertent and undesirable discharge of the mail piece contents from the mail tray receptacles, would in fact otherwise be encountered, or be caused to occur, if the mail tray and mail tub receptacles were permitted to remain in their originally improperly oriented states or dispositions and not effectively moved to their properly oriented states or dispositions.

BACKGROUND OF THE INVENTION

Mail pieces or articles are conventionally conveyed or transported within mail trays and mail tubs, the mail trays usually being utilized to convey or transport letter mail, while the mail tubs are usually utilized to convey or transport other types of mail articles, such as, for example, magazines, newspapers, and the like. The mail trays and mail tubs conventionally comprise receptacles which are provided with suitable lids or cover members in order to physically maintain the mail pieces or articles within the mail trays and mail tubs during the conveyance or transportation of the same along the conveyor or transportation route, however, the lids or cover members must obviously be removed at a predetermined time and at a predeterminedly designated work station of the automated conveying or transporation apparatus or system in order to permit the mail pieces or articles to be accessed and removed from the mail tubs and mail trays in accordance with suitable routing, sorting, batch-forming, and ultimate mail piece or article delivery processing techniques and operations. Operational difficulties, problems, breakdowns, stoppages, and the like, such as, for example, the jamming of the automated equipment or apparatus, and the necessary time and operator requirements to again render the automated equipment or apparatus operational, or the inadvertent and undesirable discharge of the mail piece or article contents from the mail tray receptacles, can, however, sometimes occur, be encountered, or be caused, if the individual mail tray and mail tub receptacles are not in fact properly disposed or oriented upon the automated conveyor or transportation apparatus or equipment.

More particularly, in accordance with desirable routing, sorting, batch-forming, and ultimate mail piece or article delivery processing techniques and operations, individual mail pieces or articles are initially deposited within the mail trays and mail tubs, and the mail trays and mail tubs are adapted to be disposed upon automated conveyor or transportation apparatus in order to subsequently convey, transport, or route the mail pieces or articles toward downstream locations at which the various mail piece or article routing, sorting, batch-forming, and ultimate mail piece or article delivery processing techniques and operations can occur or be performed. As has been noted heretofore, the mail tubs and mail trays conventionally comprise receptacles which are provided with suitable lids or cover members in order to physically maintain the mail pieces or articles within the mail trays and mail tubs during the transportation, conveyance, or routing of the same along the conveyor or transportation route. It has also been noted heretofore that the lids or cover members must obviously be removed at a predetermined time and at a predeterminedly designated work station of the automated conveying and transporting apparatus or system in order to in fact permit the mail pieces or articles to be accessed and removed from the mail tubs and mail trays in accordance with the desirable routing, sorting, batch-forming, and ultimate mail piece or article delivery processing techniques and operations. In order to permit or facilitate the proper removal of the lids or cover members from the mail trays and mail tubs, however, it is imperative that the mail trays and mail tubs be properly disposed upon the conveyor or transportation mechanism in accordance with a predetermined orientation.

More particularly, it is necessary, from an operational point of view, that the bottom wall or bottom surface of each mail tub be disposed upon the upper or top surface of the conveyor or transport mechanism. In this manner, the mail tubs will be able to properly structurally interface and operationally interact with suitable automated equipment or apparatus whereby such automated equipment or apparatus will not become jammed and will in fact be able to remove the lids or cover members from the mail tubs. In a similar manner, it is likewise necessary, from an operational point of view, that the bottom wall or bottom surface of each mail tray be disposed upon the upper or top surface of the conveyor or transport mechanism. In this manner, the inadvertent and undesirable discharge of the mail pieces or articles from the mail trays will not occur and will effectively be prevented when the lids or cover members are likewise removed from the mail trays by such automated equipment or apparatus. Unfortunately, the foregoing proper orientation or disposition of the mail trays and mail tubs upon the conveyor or transport mechanism is not always able to be achieved in a relatively high-speed, secure, and cost-effective manner. For example, in accordance with conventional modes of operation for readying or preparing the mail tubs and mail trays, and the mail pieces contained therein, for downstream routing, sorting, batch-forming, and ultimate mail piece or article delivery processing, a plurality or multiple number of mail trays, such as, for example, anywhere from two to three dozen mail trays, or alternatively, a plurality or multiple number of mail tubs, such as, for example, a dozen or more mail tubs, or still further, a mixture of such mail trays and mail tubs, are initially disposed or loaded within suitable mail tub or mail tray containers. At a predetermined location, the mail trays and mail tubs are adapted to be manually unloaded from such mail tray and mail tub containers, however, it can be readily appreciated that such manual operations, techniques, or modes of operation are obviously labor-intensive, quite tedious and fatiguing, time-consuming, and costly.

Therefore, in order to render such operations, comprising the unloading of the mail trays and mail tubs from the containers, less labor intensive, less tedious and fatiguing, less time-consuming, and more economically viable, suitable automated equipment or apparatus has been desired and sought, and has now in fact been developed and implemented. Such automated equipment or apparatus, however, has not proven to be the ultimate solution to the aforenoted operational drawbacks in view of the fact that such automated equipment or apparatus has sometimes proven to be somewhat problematic. For example, such automated equipment or apparatus is specifically structured and designed to facilitate the automatic discharge of the mail trays and mail tubs from the aforenoted containers by means of gravitational assistance. More particularly, in order to in fact achieve the automatic gravitational discharge of the mail trays and mail tubs from the aforenoted containers, the containers are adapted to operationally interface with suitable unloader mechanisms which are, in turn, adapted to elevationally tilt the containers to a predetermined inclined extent whereby the mail trays and mail tubs can effectively be discharged from the containers, in accordance with sliding modes or conveying techniques, onto suitable take-away conveyors.

Accordingly, in light of the foregoing, the mail trays and mail tubs are gravitationally discharged from the containers and onto the take-away conveyors for subsequent downstream routing, sorting, batch-forming, and ultimate mail piece or article delivery processing. Ideally, it is desired that the mail trays and mail tubs will be discharged onto the take-away conveyors in a properly aligned and oriented manner. Unfortunately, the mail trays and mail tubs are not always properly aligned upon the take-away conveyors with respect to each other as well as with respect to the longitudinal axes of the conveyors. In addition, in view of the aforenoted sliding modes or movements, the mail trays and mail tubs sometimes become piggybacked atop one another, or still further, the mail trays and mail tubs are sometimes improperly oriented wherein, for example, the mail trays and mail tubs are not disposed in their correct positional modes wherein, for example, the mail trays or mail tubs are either inverted or disposed upside down, or alternatively, they may be disposed upon or supported by one of their side wall surfaces as opposed to being properly disposed upon or supported by means of their bottom surfaces. It is further noted that while robotic equipment has also been utilized, in conjunction with the automated discharge equipment or apparatus, so as to properly align the mail tubs and mail trays upon the take-away conveyors, either with respect to each other, as well as with respect to the longitudinal axes of the conveyor mechanisms, such robotic equipment is only capable of properly aligning the mail tubs and mail trays upon the take-away conveyors with respect to each other, as well as with respect to the longitudinal axes of the conveyors, or alternatively, such robotic equipment is only capable of removing individual mail trays or mail tubs from their piggy-backed dispositions with respect to each other.

More particularly, or still further, the robotic equipment is not able to properly orient the mail trays and mail tubs in their correct dispositional modes upon the take-away conveyors whereby the mail tubs and mail trays would be properly disposed upon or supported by means of their bottom surfaces. Accordingly, the mail tubs and mail trays must be properly oriented by manual means or operations which, again, are labor-intensive, tedious and fatiguing, time-consuming, and costly. Other automated equipment or systems have also been proposed whereby such improperly oriented mail trays and mail tubs can be properly oriented, however, such automated equipment or systems are relatively complex and effectively result in an interruption of the relatively smooth and constant flow processing of the mail trays and mail tubs along the normal conveyor path. In accordance with such automated equipment or systems, for example, the improperly oriented or disoriented mail trays and mail tubs are effectively removed from the normal conveyor path, dispatched to off-line processing equipment which properly orients the particular mail tray or mail tub, and subsequently re-introduces the properly oriented mail tray or mail tub back into the normal conveyor path.

A need therefore exists in the art for new and improved automated mail tray and mail tub handling or conveyor apparatus or equipment wherein improperly oriented mail tubs and mail trays will be able to be properly, accurately, and quickly oriented by means of an in-line conveyor mechanism whereby the mail trays and mail tubs will be able to properly operationally interface or interact with downstream automated equipment or apparatus for removing the lid members or covers from the mail trays and mail tubs in order to properly access the mail pieces contained within the mail trays and mail tubs, wherein jamming of the automated equipment or apparatus will effectively be prevented, wherein the mail pieces contained within the mail trays will not be undesirably or inadvertently discharged from the mail trays, wherein the implementation of the new and improved automated mail tray and mail tub handling or conveyor apparatus or equipment as an in-line conveyor mechanism advantageously facilitates and promotes the constant and continuous flow-through processing of the mail trays and mail tubs within the over-all postal mail conveyor or transporation handling system, and wherein still further, the operational and economic disadvantages and drawbacks, characteristic of manual postal mail conveyor or handling systems or operations, will not be encountered.

OBJECT OF THE INVENTION

Accordingly, the primary object of the present invention is to provide a new and improved system, or new and improved automated apparatus or equipment which effectively overcomes the various operational drawbacks characteristic of conventional or PRIOR ART systems, equipment, or apparatus, and wherein improperly oriented mail tubs and mail trays will be able to be properly, accurately, and quickly oriented by means of an in-line conveyor mechanism whereby the mail trays and mail tubs will be able to properly operationally interface or interact with downstream automated equipment or apparatus for removing the lid members or covers from the mail trays and mail tubs in order to properly access the mail pieces contained within the mail trays and mail tubs, wherein jamming of the automated equipment or apparatus will effectively be prevented, wherein the mail pieces contained within the mail trays will not be undesirably or inadvertently discharged from the mail trays, wherein the implementation of the new and improved automated mail tray and mail tub handling or conveyor apparatus or equipment as an in-line conveyor mechanism will advantageously facilitate and promote the constant and continuous flow-through processing of the mail trays and mail tubs within the over-all postal mail conveyor or transporation handling system, and wherein still further, the operational and economic disadvantages and drawbacks, characteristic of manual postal mail conveyor or handling systems or operations, will not be encountered.

SUMMARY OF THE INVENTION

The foregoing and other objectives are achieved in accordance with the teachings and principles of the present invention through the provision of a new and improved automated system, or new and improved automated equipment or apparatus, which is integrally incorporated into the mail tray or mail tub conveyor or transportation system so as to, in effect, define an in-line mechanism with respect to the mail tray or mail tub conveyor or transportation system. More particularly, the new and improved in-line mechanism of the present invention mail tray or mail tub conveyor or transportation system comprises a four-sided tunnel into which the mail trays and mail tubs are adapted to be serially conveyed. Each side of the four-sided tunnel comprises a plurality of powered roller conveyors, and the four-sided tunnel is fixedly mounted upon a rotary assembly whereby, depending upon the particular angular disposition of the rotary assembly, one of the four sides of the four-sided tunnel is adapted to effectively form a continuum with respect to upstream and downstream sections of the mail tray or mail tub conveyor or transportation system. A camera is disposed at a position which is upstream of the four-sided tunnel so as to predetermine whether or not each mail tray or mail tub, which is being conveyed toward the four-sided tunnel, is in fact disposed in its proper orientation, or considered alternatively, whether or not a particular mail tray or mail tub is disposed in, or characterized by means of, an improper orientation.

If the camera determines that the particular mail tray or mail tub being conveyed toward the four-sided tunnel does in fact have a proper orientation or disposition, that is, the bottom wall or bottom surface of the mail tray or mail tub is already disposed upon the upper surface of the mail tray or mail tub conveyor or transportation system, then the transportation or conveyance of that particular mail tray or mail tub will be continued, without any stop-page or interruption of the system, such that the particular mail tray or mail tub will simply be conveyed through the four-sided tunnel and onto the downstream section of the conveyor or transportation system for further conveyance, transportation, and processing. Alternatively, however, if the camera determines that the particular mail tray or mail tub does not in fact have a proper orientation or disposition, that is, a wall member of the mail tray or mail tub, other than the bottom wall or bottom surface thereof, is in fact disposed upon the upper surface of the mail tray or mail tub conveyor or transportation system, then an appropriate signal will be transmitted from the camera to a programmable logic controller (PLC) indicating that either a 90° clockwise rotation, a 90° counterclockwise rotation, or a 180° rotation of the four-sided tunnel is required in order to subsequently re-orient the mail tray or mail tub to its proper disposition or orientation. The programmable logic controller (PLC) will, in turn, transmit a suitable control signal to the rotary drive mechanism operatively associated with the rotary assembly upon which the four-sided tunnel is mounted whereby the four-sided tunnel will in fact be accordingly rotated so as to undergo the requisite 90° or 180° rotation. Once such proper re-orientation of the particular mail tray or mail tub is completed, the properly oriented mail tray or mail tub is discharged from the four-sided tunnel for further downstream conveyance, transportation, and processing.

BRIEF DESCRIPTION OF THE DRAWINGS

Various other objects, features, and attendant advantages of the present invention will be more fully appreciated from the following detailed description when considered in connection with the accompanying drawings in which like reference characters designate like or corresponding parts throughout the several views, and wherein.

DETAILED DESCRIPTION OF THE PREFERRED EMBODIMENT

Referring now to the drawings, and more specifically to FIGS. 1–4 thereof, a new and improved in-line integrated flipper mechanism and conveyor system, which has been constructed in accordance with the principles and teachings of the present invention so as to achieve the proper orientation of mail tray and mail tub receptacle components, is disclosed and is generally indicated by the reference character 10. More particularly, the new and improved in-line integrated flipper mechanism and conveyor system 10 is seen to comprise a conventional roller conveyor 12 which conventionally comprises a plurality of serially arranged roller conveyors 14 so as to convey, for example, mail tray and mail tub receptacles therealong in the noted direction of travel DOT. In accordance with the unique and novel principles and teachings characteristic of the present invention, however, the conventional roller conveyor 12 effectively comprises longitudinally separated upstream and downstream component parts or sections 12U, 12D so as to permit a mail tray or mail tub flipper or rotational orientation mechanism 16, the unique and novel structure of which will be described hereinafter, to be interposed therebetween. Both of the upstream and downstream roller conveyor sections 12U, 12D, as well as the intermediate mail tray or mail tub flipper or rotational orientation mechanism 16, are mounted upon a suitable framework 18, and it is seen that the framework 18 is in turn mounted upon a plurality of telescoping leg members 20 which also have height adjustable feet members 22 operatively associated therewith such that the entire in-line integrated flipper mechanism and conveyor system 10 can be properly supported upon a floor surface 24. Furthermore, the upstream and downstream roller conveyor sections 12U, 12D, as well as the intermediate mail tray or mail tub flipper or rotational orientation mechanism 16, are respectively partially covered or enclosed within safety housings or cover assemblies 26U, 26D, and 28. It is to be understood further that the conventional upstream and downstream roller conveyor sections 12U, 12D are provided with their own programmable logic controllers (PLCs) and power supplies, not shown.

Figure 6:
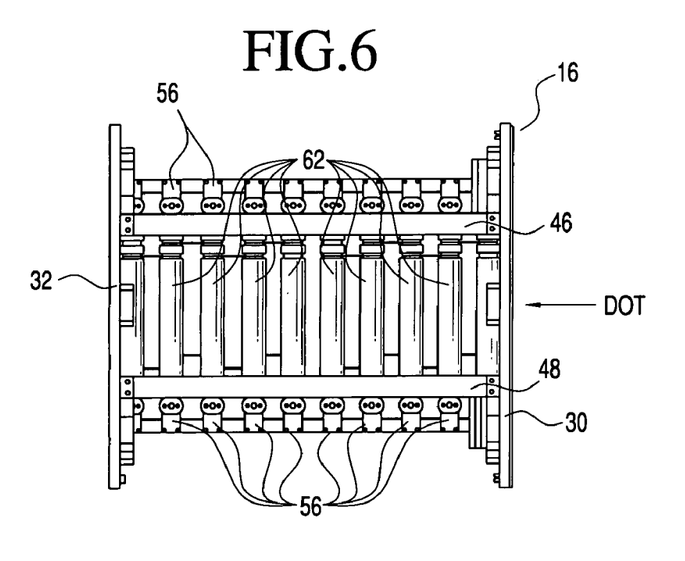
FIG. 6 is a right side elevational view of the four-sided rotational tunnel component of the new and improved automated in-line integrated mail tray and mail tub flipper mechanism and conveyor system as constructed in accordance with the principles and teachings of the present invention and as disclosed within FIG. 5.
Figure 7:
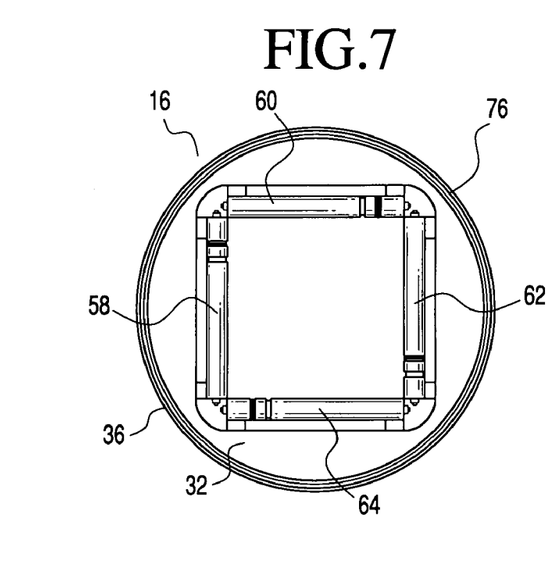
FIG. 7 is a downstream end elevational view of the four-sided rotational tunnel component of the new and improved automated in-line integrated mail tray and mail tub flipper mechanism and conveyor system as constructed in accordance with the principles and teachings of the present invention and as disclosed within FIGS. 5 and 6.

With reference now being additionally made to FIGS. 5–7, the details of the new and improved mail tray or mail tub flipper or rotational orientation mechanism 16, as constructed in accordance with the principles and teachings of the present invention, will now be described. More particularly, it is seen that the new and improved mail tray or mail tub flipper or rotational orientation mechanism 16 comprises a rotatable tubular housing or cage structure which has a substantially square-shaped cross-sectional configuration, and it is to be appreciated that each one of the four sides of the substantially square-shaped tubular housing or cage structure is substantially identical to each other such that the substantially square-shaped tubular housing or cage structure is symmetrical around the longitudinal axis thereof. oppositely disposed upstream and downstream end portions of the substantially square-shaped tubular housing or cage structure respectively comprise support plates 30, 32 which have circular external or outer peripheral edge portions 34, 36, and square-shaped apertures are formed within the central portions of the end support plates 30, 32, it being noted that only the square-shaped aperture 38 formed within the end support plate 30 is visible. A plurality of longitudinally or axially extending tie bars fixedly interconnect the oppositely disposed support plates 30, 32 together so as to effectively cooperate with the oppositely disposed support plates 30, 32 in defining the substantially square-shaped tubular housing or cage structure of the mail tray or mail tub flipper or rotational orientation mechanism 16, and it is seen that the plurality of tie bars comprises, for example, eight tie bars 40–54.

More particularly, the eight tie bars 40–54 are arranged within four sets of tie bars, wherein each set of the tie bars comprises two tie bars disposed within the vicinity of each corner region of the substantially square-shaped tubular housing or cage structure in such a manner that the two tie bars are disposed upon adjacent sides of the substantially square-shaped tubular housing or cage structure. For example, tie bars 40, 42 are disposed within the vicinity of the upper right corner region of the substantially square-shaped tubular housing or cage structure, as viewed in FIG. 5, such that tie bar 40 will effectively define the upper end or edge portion of the right side wall member of the substantially square-shaped tubular housing or cage structure, while tie bar 42 will effectively define the right end or edge portion of the upper side wall member of the substantially square-shaped tubular housing or cage structure.

In a similar manner, tie bar 44 will effectively define the left end or edge portion of the upper side wall member of the substantially square-shaped tubular housing or cage structure, while tie bar 46 will effectively define the upper end or edge portion of the left side wall member of the substantially square-shaped tubular housing or cage structure. Continuing further, tie bar 48 will effectively define the lower end or edge portion of the left side wall member of the substantially square-shaped tubular housing or cage structure, while tie bar 50 will effectively define the left end or edge portion of the lower side wall member of the substantially square-shaped tubular housing or cage structure. Lastly, tie bar 52 will effectively define the right end or edge portion of the lower side wall member of the substantially square-shaped tubular housing or cage structure, while tie bar 54 will effectively define the lower end or edge portion of the right side wall member of the substantially square-shaped tubular housing or cage structure.

Figure 5:
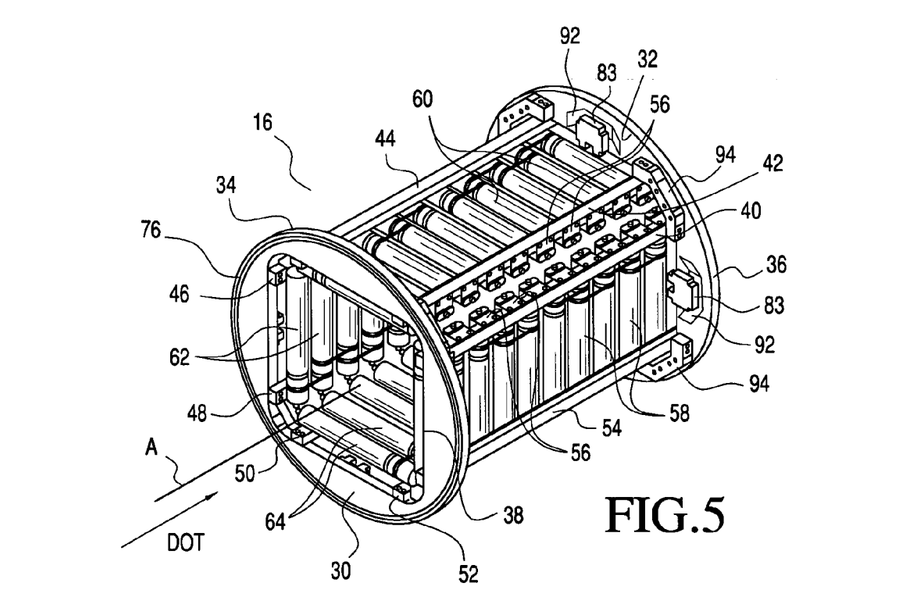
FIG. 5 is a left side perspective view of the four-sided tunnel component of the new and improved automated in-line integrated mail tray and mail tub flipper mechanism and conveyor system as constructed in accordance with the principles and teachings of the present invention and wherein the four-sided tunnel component is adapted to be rotated through oppositely oriented 90° angular movements or extents, or through a 180° angular movement or extent, in order to achieve the desired proper orientation of a particular mail tray or mail tub for subsequent conveyance along the conveyor system.

Still further, a plurality of longitudinally or axially spaced mounting brackets 56 are fixedly mounted upon each one of the tie bars 40–54, and in this manner, as can best be appreciated from FIG. 5, the mounting brackets 56 which are fixedly mounted upon those tie bars 40–54 which effectively cooperate together so as to form or define the aforenoted right side, upper side, left side, and lower side wall portions of the substantially square-shaped tubular housing or cage structure will be disposed in opposed pairs or sets. Accordingly, such paired sets of mounting brackets 56 will serve to rotatably support therebetween a plurality of longitudinally or axially spaced, transversely oriented conveyor rollers 58, 60, 62, 64 which effectively form the aforenoted right side, upper side, left side, and lower side wall portions of the substantially square-shaped tubular housing or cage structure which can now be appreciated as substantially comprising a tunnel structure through which the mail trays or mail tubs are to be conveyed. The mail tub or mail tray flipper or rotational orientation mechanism 16 is adapted to be rotatably mounted with respect to the upstream and downstream sections 12U, 12D of the roller conveyor 12, and around the axis A thereof, such that one of the sets of conveyor rollers 58, 60, 62, 64 of the substantially square-shaped tubular housing, cage, or tunnel structure is always disposed at the lowermost position so as to effectively define the lower side or bottom wall portion of the substantially square-shaped tubular tunnel, housing, or cage structure. Accordingly, when a particular one of the sets of the conveyor rollers 58, 60, 62, 64 is in fact disposed at the lowermost position so as to effectively define the lower side or bottom wall portion of the substantially square-shaped tubular housing, cage, or tunnel structure, as is the case of the conveyor rollers 64 as can readily be appreciated from FIG. 5, then those particular conveyor rollers 64 will effectively cooperate with the conveyor rollers 14 that comprise both the upstream and downstream sections 12U, 12D of the roller conveyor 12 so as to effectively form a continuous roller conveyor structure.

Figure 1:
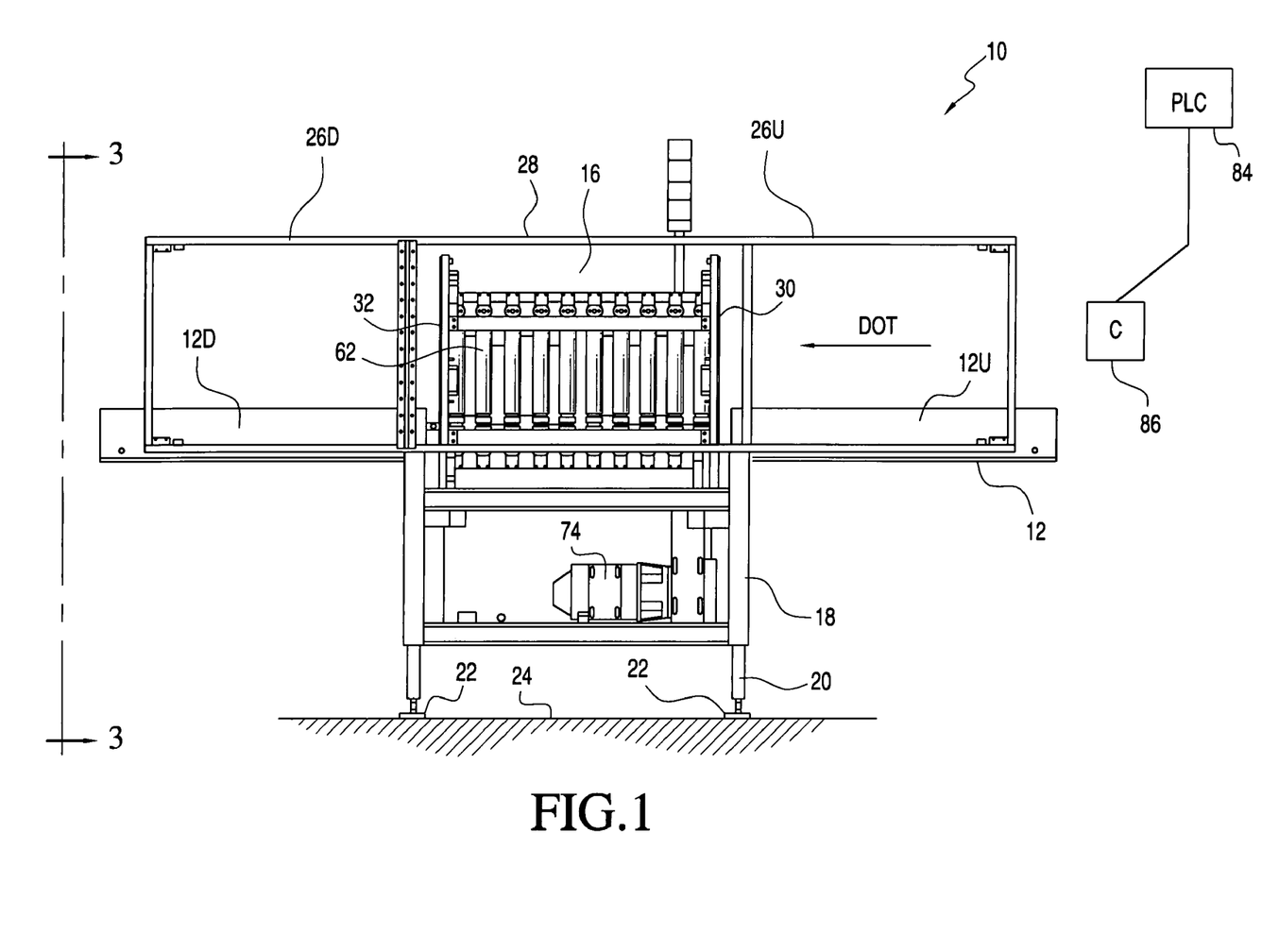
FIG. 1 is a left side elevational view of the new and improved automated in-line integrated mail tray and mail tub flipper mechanism and conveyor system constructed in accordance with the principles and teachings of the present invention and showing the cooperative parts thereof.
Figure 2:
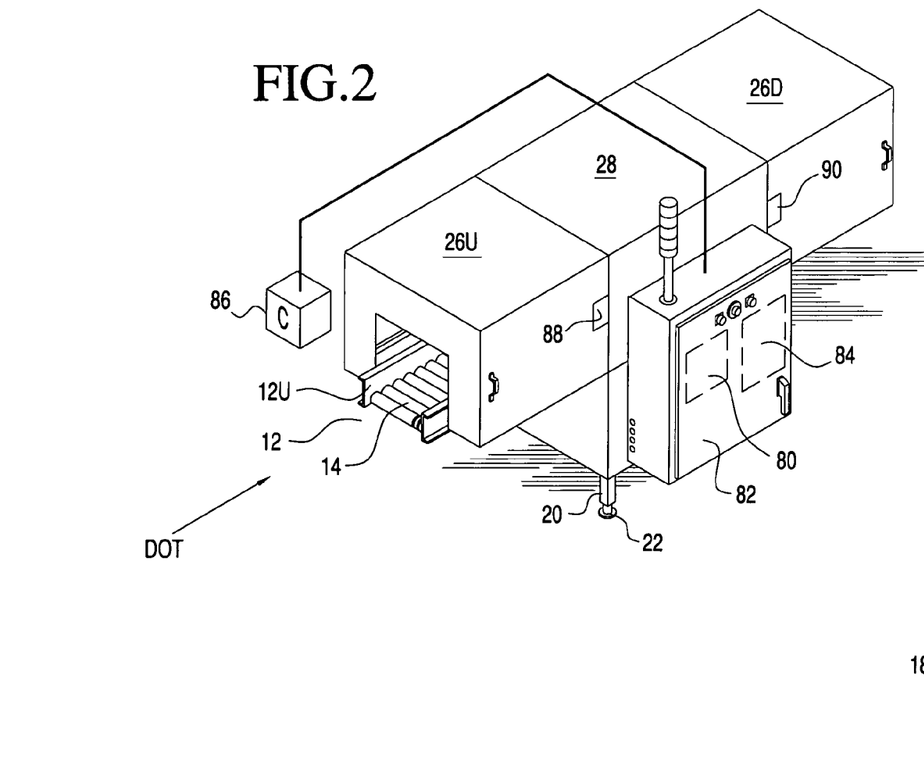
FIG. 2 is a right side perspective view of the new and improved automated in-line integrated mail tray and mail tub flipper mechanism and conveyor system as disclosed within FIG. 1.
Figure 3:
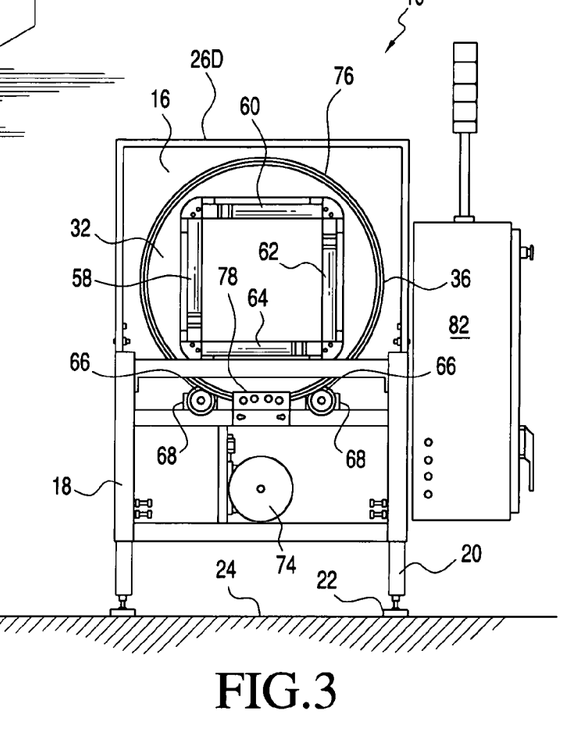
FIG. 3 is a downstream end elevational view of the new and improved automated in-line integrated mail tray and mail tub flipper mechanism and conveyor system as disclosed within FIGS. 1 and 2, and as viewed in the direction taken along the lines 3—3 of FIG. 1.
Figure 4:
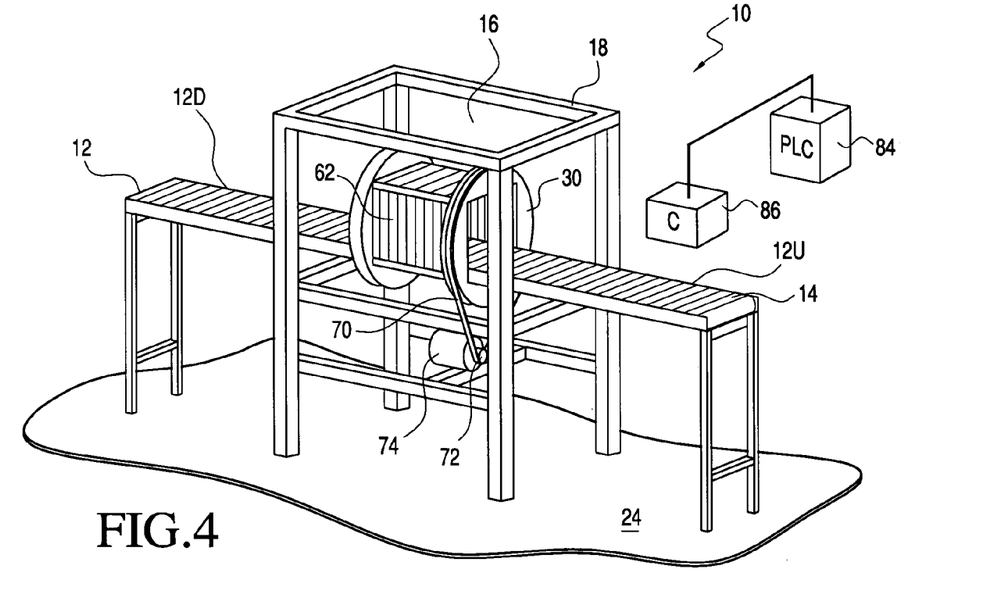
FIG. 4 is a left side perspective view of the new and improved automated in-line integrated mail tray and mail tub flipper mechanism and conveyor system, as disclosed within FIG. 1, and similar to but opposite to that of FIG. 2, wherein, however, the safety or protective covers have been removed so as to illustrate the interior components of the new and improved automated in-line integrated mail tray and mail tub flipper mechanism and conveyor system of the present invention.

In order to enable the mail tray or mail tub flipper or rotational orientation mechanism 16 to be rotatably mounted within the in-line integrated flipper mechanism and conveyor system 10 of the present invention, and with respect to the upstream and downstream sections 12U, 12D of the roller conveyor 12, whereby any one of the sets of the conveyor rollers 58, 60, 62, 64 of the substantially square-shaped tubular housing, cage, or tunnel structure can in fact be disposed at the lowermost position so as to effectively define the lower side or bottom wall portion of the substantially square-shaped tubular housing, cage, or tunnel structure, a pair of laterally or transversely spaced support or load-bearing rollers 66, 66 are mounted within a pair of suitable roller mounting blocks 68, 68 at each end of the central portion of the framework 18 within which the mail tray or mail tub flipper or rotational orientation mechanism 16 is disposed. The peripheral edge portions 34, 36 of the end support plates 30, 32 are adapted to be seated upon the support or load-bearing rollers 66, 66, as is illustrated within FIG. 3 in connection with the end support plate 32 and the peripheral edge portion 36 thereof, and in order to cause rotation of the mail tray or mail tub flipper or rotational orientation mechanism 16, a pulley belt 70, as best seen in FIG. 4, is adapted to have a first endless portion thereof disposed around a sheave portion of the end support plate 30 while a second endless portion of the pulley belt 70 is disposed around a sheave or pulley member 72. The pulley member or sheave 72 is rotatably mounted upon the output drive shaft of a gear motor 74 which is fixedly mounted upon a lower section of the framework 18.

Accordingly, when the gear motor 74 is actuated so as to undergo suitable rotation either in the clockwise or counterclockwise direction, the mail tray or mail tub flipper or rotational orientation mechanism 16 is correspondingly rotated, through means of predetermined angular movements either in the clockwise or counterclockwise direction so as to, in turn, cause the substantially square-shaped tubular housing, cage, or tunnel structure to undergo such rotational movement. In this manner, a particular one of the sets of the conveyor rollers 58, 60, 62, 64, forming the upper, lower, and side wall members of the substantially square-shaped tubular housing, cage, or tunnel structure of the mail tray or mail tub flipper or rotational orientation mechanism 16, will be disposed at the lowermost position so as to in fact define the lower wall or bottom surface portion of the substantially square-shaped tubular housing, cage, or tunnel structure and thereby be disposed in a substantially coplanar continuum disposition with respect to the conveyor rollers 14 comprising the upstream and downstream sections 12U, 12D of the roller conveyor 12 such that mail trays or mail tubs can be conveyed from the upstream section 12U of the roller conveyor 12, through the substantially square-shaped tubular housing, cage, or tunnel structure of the mail tray or mail tub flipper or rotational orientation mechanism 16, and onto the downstream section 12D of the roller conveyor 12.

Continuing further, it is noted that two of the conveyor rollers of each set of conveyor rollers 58, 60, 62, 64 are adapted to be an electrically-powered driven conveyor roller, with the remaining conveyor rollers of each set of conveyor rollers 58, 60, 62, 64 being operatively connected to such electrically-powered driven conveyor rollers, and in order to provide electrical power to the electrically-powered driven conveyor rollers of the sets of conveyor rollers 58, 60, 62, 64, the downstream support plate 32 is provided with an annular commutator ring assembly 76 comprising radially inner and radially outer commutator rings. A brush assembly 78 is fixedly mounted upon the downstream end portion of the central section of the framework 18, as may best be appreciated from FIG. 3, so as to always be in contact with the commutator ring assembly 76, and accordingly, electrical power is able to be transmitted to the commutator ring assembly 76 from the brush assembly 78. This electrical power is generated from a suitable electric power supply 80 which is disposed within a power supply cabinet 82 which may be mounted upon either the left or right side of the enclosure 28 covering the central portion of the framework 18, as can best be seen in FIG. 2 or 3, and the electrical power is, in turn, electrically transmitted to four motor controllers 83, only two of which are visible within FIG. 5, so as to supply electrical power to the electrically-powered driven conveyor rollers of the four sets of conveyor rollers 58, 60, 62, 64. A programmable logic controller (PLC) 84, also disposed within the power supply cabinet 82, is operatively connected to the electric power supply 80, and accordingly, when the programmable logic controller (PLC) 84 sends an appropriate signal to the electric power supply 80, the electric power supply 80 supplies electrical power to the electrically-powered driven conveyor rollers of the four sets of conveyor rollers 58, 60, 62, 64, through means of the brush assembly 78, the commutator ring assembly 76, and the motor controllers 83, so as to rotatably drive the four sets of conveyor rollers 58, 60, 62, 64. It is also noted that the programmable logic controller (PLC) 84 is operatively connected to the gear motor 74, as well as to the previously noted programmable logic controllers (PLCS) and power supplies, not shown, operatively associated with the powered conveyor rollers 14 disposed within both the upstream and downstream sections 12U, 12D of the roller conveyor 12.

As has been alluded to hereinbefore, the mail tray or mail tub flipper or rotational orientation mechanism 16 is adapted to be rotated through a predetermined angular rotation to a predetermined angular position so as to always ensure that a particular mail tray or mail tub, which has originally been conveyed onto a particular one of the sets of powered conveyor rollers 58, 60, 62, 64, and which may not be properly oriented as desired for further downstream processing, is in fact properly oriented such that the down-stream processing can in fact be satisfactorily performed without encountering any operational difficulties. More particularly, several operational scenarios are envisioned. For example, in accordance with a first anticipated operational scenario, if it is determined that a particular mail tray or mail tub, which has originally been conveyed onto a particular one of the sets of powered conveyor rollers 58, 60, 62, 64, is in fact already properly oriented as desired for further downstream processing, then the mail tray or mail tub flipper or rotational orientation mechanism 16 will not have to undergo any angular rotation and the particular mail tray or mail tub will be conveyed directly from the upstream section 12U of the roller conveyor 12, through the substantially square-shaped tubular housing, cage, or tunnel structure of the mail tray or mail tub flipper or rotational orientation mechanism 16, and onto the downstream section 12D of the roller conveyor 12.

Alternatively, in accordance with a second anticipated operational scenario, if it is determined, for example, that a particular mail tray or mail tub, which has originally been conveyed into the substantially square-shaped tubular housing, cage, or tunnel structure of the mail tray or mail tub flipper or rotational orientation mechanism 16 so as to be disposed upon the set of powered conveyor rollers 64 which form the bottom or floor portion of the substantially square-shaped tubular housing, cage, or tunnel structure as disclosed within FIG. 5, is not in fact properly oriented as desired for further downstream processing, but is in fact inverted or oriented in an upside-down mode, then the mail tray or mail tub flipper or rotational orientation mechanism 16 will have to undergo an angular rotation of 180° so as to effectively cause the set of powered conveyor rollers 60 to now be disposed at the lowermost position and thereby form the bottom or floor portion of the substantially square-shaped tubular housing, cage, or tunnel structure. The particular mail tray or mail tub will now therefore be disposed in its proper orientation whereby the mail tray or mail tub can be conveyed out of the substantially square-shaped tubular housing, cage, or tunnel structure and onto the downstream section 12D of the roller conveyor 12 such that further downstream processing of the mail tray or mail tub can now in fact be properly performed without encountering any operational difficulties.

Alternatively, still further, in accordance with a third anticipated operational scenario, if it is determined, for example, that a particular mail tray or mail tub, which has originally been conveyed into the substantially square-shaped tubular housing, cage, or tunnel structure of the mail tray or mail tub flipper or rotational orientation mechanism 16 so as to be disposed upon the set of powered conveyor rollers 64 which form the bottom or floor portion of the substantially square-shaped tubular housing, cage, or tunnel structure as disclosed within FIG. 5, is not in fact properly oriented as desired for further downstream processing, but is in fact oriented in such a manner that the top cover or lid portion of the mail tray or mail tub is disposed toward the set of powered conveyor rollers 62 as disclosed within FIG. 5, then the mail tray or mail tub flipper or rotational orientation mechanism 16 will have to undergo an angular rotation of 90° in the clockwise direction so as to effectively cause the set of powered conveyor rollers 58 to now be disposed at the lowermost position and thereby form the bottom or floor portion of the substantially square-shaped tubular housing, cage, or tunnel structure. The particular mail tray or mail tub will now therefore be disposed in its proper orientation whereby the mail tray or mail tub can be conveyed out of the substantially square-shaped tubular housing, cage, or tunnel structure and onto the downstream section 12D of the roller conveyor 12 such that further downstream processing of the mail tray or mail tub can now in fact be properly performed without encountering any operational difficulties.

Lastly, in accordance with a fourth anticipated operational scenario, if it is determined, for example, that a particular mail tray or mail tub, which has originally been conveyed into the substantially square-shaped tubular housing, cage, or tunnel structure of the mail tray or mail tub flipper or rotational orientation mechanism 16 so as to be disposed upon the set of powered conveyor rollers 64 which form the bottom or floor portion of the substantially square-shaped tubular housing, cage, or tunnel structure as disclosed within FIG. 5, is not in fact properly oriented as desired for further downstream processing, but is in fact oriented in such a manner that the top cover or lid portion of the mail tray or mail tub is disposed toward the set of powered conveyor rollers 58 as disclosed within FIG. 5, then the mail tray or mail tub flipper or rotational orientation mechanism 16 will have to undergo an angular rotation of 90° in the counter-clockwise direction so as to effectively cause the set of powered conveyor rollers 62 to now be disposed at the lowermost position and thereby form the bottom or floor portion of the substantially square-shaped tubular housing, cage, or tunnel structure. The particular mail tray or mail tub will now therefore be disposed in its proper orientation whereby the mail tray or mail tub can be conveyed out of the substantially square-shaped tubular housing, cage, or tunnel structure and onto the downstream section 12D of the roller conveyor 12 such that further down-stream processing of the mail tray or mail tub can now in fact be properly performed without encountering any operational difficulties.

In order to achieve the aforenoted operational procedures whereby the mail tray or mail tub flipper or rotational orientation mechanism 16 will undergo the predetermined proper angular rotation in order to achieve the proper orientation of a particular mail tray or mail tub disposed within the substantially square-shaped tubular housing, tunnel, or cage structure of the mail tray or mail tub flipper or rotational orientation mechanism 16, additional structural components are provided within the new and improved in-line integrated flipper mechanism and conveyor system 10 of the present invention. More particularly, as schematically illustrated within FIGS. 1, 2, and 4, a camera system 86 is operatively disposed at a position adjacent to the upstream section 12U of the roller conveyor 12 so as to view each mail tray or each mail tub as the same is being conveyed along the upstream section 12U of the roller conveyor 12 in preparation for the conveyed introduction of the particular mail tray or mail tub into the intermediate mail tray or mail tub flipper or rotational orientation mechanism 16 of the overall conveyor system. The camera system 86 comprises a self-contained system which includes a dedicated processor that can effectively pre-process an image of each oncoming mail tray or mail tub such that the positional orientation of the mail tray or mail tub can be determined to be proper or improper, and which can transmit an appropriate signal to the programmable logic controller (PLC) 84 such that the programmable logic controller (PLC) 84 can, in turn, send appropriate signals to, for example, the gear motor 74 in order to activate the same so as to cause the necessary rotation of the mail tub flipper or rotational orientation mechanism 16 in order to in fact ultimately achieve the desired proper orientation of the particular mail tray or mail tub. Alternatively, of course, if it is determined that the particular incoming mail tray or mail tub is already has a proper orientation, then the programmable logic controller (PLC) 84 will, of course, not activate the gear motor 74 but will alternatively send appropriate signals to the programmable logic controllers (PLCs) and power supplies, not shown, operatively associated with the powered conveyor rollers 14 disposed within both the upstream and downstream sections 12U, 12D of the roller conveyor 12, as well as to the electric power supply 80 for the electrically-powered driven conveyor rollers of the four sets of conveyor rollers 58, 60, 62, 64 whereby the particular mail tray or mail tub can continue to be conveyed without any stoppage thereof.

More particularly, and as has been alluded to hereinbefore, if the particular mail tray or mail tub is in fact disposed in a proper orientation, then angular rotation of the mail tray or mail tub flipper or rotational orientation mechanism 16 is not in fact required, and the conveyor rollers 14 of the upstream and downstream sections 12U, 12D of the roller conveyor 12, along with the particular set of conveyor rollers 58, 60, 62, 64 that is disposed at the lower-most bottom or floor position within the mail tray or mail tub flipper or rotational orientation mechanism 16, serve to convey the mail tray or mail tub along the upstream section 12U of the roller conveyor 12, through the substantially square-shaped tubular housing, cage, or tunnel structure of the mail tray or mail tub flipper or rotational orientation mechanism 16, and onto the downstream section 12D of the roller conveyor 12. On the other hand, if the particular mail tray or mail tub is in fact disposed in an improper orientation, then suitable angular rotation of the mail tray or mail tub flipper or rotational orientation mechanism 16 is in fact required, as has been noted hereinbefore in accordance with the aforenoted second, third, and fourth anticipated scenarios, whereupon completion of the appropriate angular rotational movement of the mail tray or mail tub flipper or rotational orientation mechanism 16 whereby the particular mail tray or mail tub will now be disposed in a proper orientation, the particular set of conveyor rollers 58, 60, 62, 64 that is now disposed at the lowermost bottom or floor position within the mail tray or mail tub flipper or rotational orientation mechanism 16, along with the conveyor rollers 14 of the downstream section 12D of the roller conveyor 12, can convey the mail tray or mail tub through the substantially square-shaped tubular housing, cage, or tunnel structure of the mail tray or mail tub flipper or rotational orientation mechanism 16 and onto the downstream section 12D of the roller conveyor 12.

In order to achieve the various operations of, for example, the conveyor rollers 14 of the upstream and down-stream sections 12U, 12D of the roller conveyor 12, the conveyor rollers 58, 60, 62, 64 within the substantially square-shaped tubular housing, cage, or tunnel structure of the mail tray or mail tub flipper or rotational orientation mechanism 16, and the angular rotation of the mail tray or mail tub flipper or rotational orientation mechanism 16 in an operationally coordinated manner, a first upstream sensor 88, such as, for example, a photodetector, is disposed at the interface defined between the upstream section 12U of the roller conveyor 12 and the upstream end portion of the mail tray or mail tub flipper or rotational orientation mechanism 16. In a similar manner, a second sensor 90, such as, for example, another photodetector, is disposed at the interface defined between the downstream end portion of the mail tray or mail tub flipper or rotational orientation mechanism 16 and the downstream section 12D of the roller conveyor 12.

Accordingly, if, for example, the particular mail tray or mail tub that is being conveyed along the upstream section 12U of the roller conveyor 12 is determined to be properly oriented, as a result of the image of the particular mail tray or mail tub being captured and pre-processed by means of the camera system 86, and as a result of a suitable command or signal being transmitted to the programmable logic controller (PLC) 84, then the programmable logic controller (PLC) 84 can maintain the roller conveyors of both the upstream and downstream sections 12U, 12D of the roller conveyor 12, along with the roller conveyors 58, 60, 62, 64 within the substantially square-shaped tubular housing, tunnel, or cage structure of the mail tray or mail tub flipper or rotational orientation mechanism 16, in an active state whereby the properly oriented mail tray or mail tub will be conveyed along the upstream section 12U of the roller conveyor 12, through the substantially square-shaped tubular housing, cage, or tunnel structure of the mail tray or mail tub flipper or rotational orientation mechanism 16, and along the downstream section 12D of the roller conveyor 12. However, if, for example, the particular mail tray or mail tub that is being conveyed along the upstream section 12U of the roller conveyor 12 is determined to be improperly oriented, as a result of the image of the particular mail tray or mail tub being captured and pre-processed by means of the camera system 86, whereby appropriate angular rotation of the mail tray or mail tub flipper or rotational orientation mechanism 16 is required, a suitable correction command or signal will be transmitted from the camera system 86 to the programmable logic controller (PLC) 84 such that the programmable logic controller (PLC) 84 can, for example, send an appropriate command or signal to the programmable logic controller (PLC) and the power supply, not shown, operatively associated with the powered conveyor rollers 14 comprising the downstream section 12D of the roller conveyor 12 so as to terminate operation of such powered conveyor rollers 14 of the downstream section 12D of the roller conveyor 12.

In addition, the programmable logic controller (PLC) 84 will also send appropriate commands or signals to the programmable logic controller (PLC) and the power supply, not shown, operatively associated with the powered conveyor rollers 14 comprising the upstream section 12U of the roller conveyor 12, as well as to the power supply 80 operatively associated with the powered conveyor rollers 58, 60, 62, 64, through means of the brush assembly 78, the commutator ring assembly 76, and the motor controllers 83, so as to maintain such powered conveyor rollers 14, 58, 60, 62, 64 active. Once the particular mail tray or mail tub has then passed the upstream photodetector 88 whereby the up-stream photodetector 88 will transmit an appropriate signal back to the programmable logic controller (PLC) 84 to the effect that the particular mail tray or mail tub has in fact passed the upstream photodetector 88 and has entered the substantially square-shaped tubular housing, cage, or tunnel structure of the mail tray or mail tub flipper or rotational orientation mechanism 16, then the programmable logic controller (PLC) 84 will send appropriate commands or signals to the programmable logic controller (PLC) and the power supply, not shown, operatively associated with the powered conveyor rollers 14 comprising the upstream section 12U of the roller conveyor 12, as well as to the power supply 80 which is controlling the electrical power transmitted to the conveyor rollers 58, 60, 62, 64, through means of the brush assembly 78, the commutator ring assembly 76, and the motor controllers 83, whereby electrical power to the conveyor rollers 14 comprising the upstream section 12U of the roller conveyor 12, as well as electrical power to the conveyor rollers 58, 60, 62, 64, will be terminated.

Accordingly, no further conveyance of mail trays or mail tubs along the upstream section 12U of the roller conveyor 12 is permitted, and the particular mail tray or mail tub is now stationarily disposed within the substantially square-shaped tubular tunnel, housing, or cage structure of the mail tray or mail tub flipper or rotational orientation mechanism 16, although such particular mail tray or mail tub is still disposed in its improper orientation. Therefore, in order to dispose the particular mail tray or mail tub in its proper orientation, the programmable logic controller (PLC) 84 subsequently activates the gear motor 74 so as to cause the mail tray or mail tub flipper or rotational orientation mechanism 16 to undergo an appropriate angular rotation, either in the amount of 90° in either the clockwise or counterclockwise direction, or in the amount of 180°, depending upon the particular improper orientation of the particular mail tray or mail tub.

It is noted still further that once the mail tray or mail tub flipper or rotational orientation mechanism 16 has in fact undergone the appropriate amount of angular rotation so as to in fact now dispose the particular mail tray or mail tub in its proper orientation, the programmable logic controller (PLC) 84 will effectively terminate power to the gear motor 74, and will once again activate the power supply 80 so as to provide electrical power to the conveyor rollers 58, 60, 62, 64, through means of the brush assembly 78, the commutator ring assembly 76, and the motor controllers 83, as well as communicate with the programmable logic controllers and power supplies, not shown, operatively associated with the conveyor rollers 14 comprising the downstream section 12D of the roller conveyor 12, so as to provide electrical power to the conveyor rollers 14 comprising the downstream section 12D of the roller conveyor 12. In this manner, the properly oriented mail tray or mail tub can now be discharged out from the substantially square-shaped tubular housing, cage, or tunnel structure of the mail tray or mail tub flipper or rotational orientation mechanism 16 and conveyed along the downstream section 12D of the roller conveyor 12. Still yet further, once the particular, properly oriented mail tray or mail tub has passed the downstream photodetector 90, a signal is transmitted from the photodetector 90 to the programmable logic controller (PLC) 84 whereby the programmable logic controller (PLC) 84 will communicate with the programmable logic controller (PLC) and the power supply, not shown, operatively associated with the conveyor rollers 14 comprising the upstream section 12U of the roller conveyor 12 whereby the conveyor rollers 14 comprising the upstream section 12U of the roller conveyor 12 are again activated so as to again convey another mail tray or mail tub along the upstream section 12U of the roller conveyor 12 and toward the mail tray or mail tub flipper or rotational orientation mechanism 16 whereby the cyclic mode of operation can be repeated.

It is also noted in connection with the angular rotation of the mail tray or mail tub flipper or rotational orientation mechanism 16 that, in order to effectively prevent any under-rotation or over-rotation of the particular mail tray or mail tube with respect or relative to the angular rotation of the mail tray or mail tub flipper or rotational orientation mechanism 16 so as to in fact ensure that as a result of the angular rotation of the mail tray or mail tub flipper or rotational orientation mechanism 16, the particular mail tray or mail tube does in fact achieve the desired re-orientation thereof, the new and improved in-line integrated flipper mechanism and conveyor system 10 of the present invention is provided with additional structural components and is operated in accordance with predetermined modes of operation. For example, when the gear motor 74 is operated so as to rotate the mail tray or mail tub flipper or rotational orientation mechanism 16 through means of an angular rotational displacement of either 90° or 180° in order to achieve a particular angular orientation thereof so as to effectively re-orient the disposition of a particular mail tray or mail tub disposed internally within the substantially square-shaped tubular housing, cage, or tunnel structure of the mail tray or mail tub flipper or rotational orientation mechanism 16, the angular rotational speed at which the mail tray or mail tub flipper or rotational orientation mechanism 16 is in fact rotated is maintained to be within the range of 30–40 revolutions per minute (30–40 RPM).

The reason for this is that if, for example, the angular rotational speed is substantially less than the aforenoted angular speed of 30–40 revolutions per minute (30–40 RPM), then in lieu of the particular mail tray or mail tub undergoing a predetermined amount of angular rotation corresponding to the predetermined angular rotation of the mail tray or mail tub flipper or rotational orientation mechanism 16, the particular mail tray or mail tub may itself tip, flip, or angularly rotate with respect or relative to the one of the side walls of the substantially square-shaped tubular housing, cage, or tunnel structure of the mail tray or mail tub flipper or rotational orientation mechanism 16 upon which the particular mail tray or mail tub was originally disposed or supported. Accordingly, when the predetermined 90° or 180° angular rotation of the mail tray or mail tub flipper or rotational orientation mechanism 16 has been completed, the particular mail tray or mail tub will not in fact have achieved its desired proper orientation or disposition.

In a similar manner, if, for example, the angular rotational speed is substantially greater than the aforenoted angular speed of 30–40 revolutions per minute (30–40 RPM), then in lieu of the particular mail tray or mail tub undergoing a predetermined amount of angular rotation corresponding to the predetermined angular rotation of the mail tray or mail tub flipper or rotational orientation mechanism 16, the substantially square-shaped tubular housing, cage, or tunnel structure of the mail tray or mail tub flipper or rotational orientation mechanism 16 may in effect undergo angular rotation with respect or relative to the particular mail tray or mail tub disposed internally within the substantially square-shaped tubular housing, cage, or tunnel structure of the mail tray or mail tub flipper or rotational orientation mechanism 16 whereby, again, when the predetermined 90° or 180° angular rotation of the mail tray or mail tub flipper or rotational orientation mechanism 16 has been completed, the particular mail tray or mail tub will not in fact be disposed at its desired proper orientation or disposition.

It is therefore lastly noted that in order to ensure the fact that the mail tray or mail tub flipper or rotational orientation mechanism 16 has in fact undergone a desirably correct angular rotation of either 90° or 180°, suitable additional sensors may be provided upon the mail tray or mail tub flipper or rotational orientation mechanism 16 for operative cooperation with additional sensors which may be disposed, for example, internally within the enclosure or housing 28 within which the mail tray or mail tub flipper or rotational orientation mechanism 16 is angularly rotated. For example, as can best be appreciated from FIG. 5, a plurality of first sensors 92 are mounted upon the end support plate 32 at positions which are angularly or circumferentially spaced 90° apart from each other. In addition, a plurality of second sensors 94 are likewise mounted upon the end support plate 32 at positions which are angularly or circumferentially spaced 90° apart from each other and which are also interposed between the plurality of first sensors 92 so as to be angularly spaced from adjacent ones of the first sensors 92 through means of an angular or circumferential displacement of 45°. Still further, first and second additional single sensors, not shown, are placed internally within the enclosure or housing 28 so as to be disposed at a particular axis-coordinate or 90° angular position, such as, for example, a position corresponding with or to the location of the uppermost one of the first sensors 92 as disclosed within FIG. 5, as well as at a position displaced 45° from the aforenoted 90° angular position so as to effectively correspond with or to the location of second sensor 94 located immediately to the right of the noted first sensor as seen in FIG. 5.

In this manner, when any one of the first sensors 92 positionally aligns with the first additional single sensor, not shown, a 90° HOME position for the angular orientation of the mail tray or mail tub flipper or rotational orientation mechanism 16 is defined whereby it is ensured that one of the sets of conveyor rollers 58, 60, 62, 64 will in fact be properly aligned in a coplanar manner with the upstream and downstream sections 12U, 12D of the roller conveyor 12, whereas when any one of the first or second sensors 92, 94 positionally aligns with the second additional single sensor, not shown, this is an indication that the rotational angular movement of the mail tray or mail tub flipper or rotational orientation mechanism 16 is approaching a HOME position whereby the angular rotational speed of the mail tray or mail tub flipper or rotational orientation mechanism 16 may begin to be decelerated, as determined by means of the operation of the gear motor 74 and in accordance with suitable control signals transmitted thereto by means of the programmable logic controller (PLC) 84, such that the angular disposition of the mail tray or mail tub flipper or rotational orientation mechanism 16 may in fact attain its desired or proper HOME position depending, of course, upon the predetermined amount of angular rotation, that is, either 90° or 180°, through which the mail tray or mail tub flipper or rotational orientation mechanism 16 was in fact to be moved in order to achieve the desired re-orientation of the particular mail tray or mail tub disposed within the mail tray or mail tub flipper or rotational orientation mechanism 16.

Thus, it may be seen that in accordance with the principles and teachings of the present invention, there has been provided a new and improved article or postal mail conveyor or transportation system which has a mail tray or mail tub in-line flipper mechanism integrally incorporated therein that has been specifically constructed and assembled so as to enable mail tray and mail tub receptacles, which may initially be disposed upon the conveyor or transportation mechanism in improperly oriented states or dispositions, to be automatically moved to properly oriented dispositions or states such that the mail tray and mail tub receptacles can in fact be processed further by automated equipment or apparatus without encountering or causing operational difficulties, problems, breakdowns, stoppages, or the like, such as, for example, the jamming of the automated equipment or apparatus, or the inadvertent and undesirable discharge of the mail piece contents from the mail tray receptacles, wherein such operational difficulties, problems, breakdowns, stop-pages, or the like, such as, for example, the jamming of the automatic equipment or apparatus, or the inadvertent and undesirable discharge of the mail piece contents from the mail tray receptacles, would in fact otherwise be encountered, or be caused to occur, if the mail tray and mail tub receptacles were permitted to remain in their originally improperly oriented states or dispositions and not effectively moved to their properly oriented states or dispositions by means of the apparatus of the present invention.

Lastly, it is noted that, in light of the foregoing disclosure, many variations and modifications of the present invention are possible. It is therefore to be understood that within the scope of the appended claims, the present invention may be practiced otherwise than as specifically described herein.

What is claimed as new and desired to be protected by Letters Patent of the United States of America, is:

1. A mechanism, for use in connection with an article conveyor system conveying a plurality of articles along a predetermined axial path, so as to ensure that each one of the plurality of articles being conveyed along the predetermined axial path can attain a predeterminedly proper orientation, comprising:

a tubular housing, defined around a longitudinal axis which is coaxially aligned with the axis defined by the predetermined axial path along which the plurality of articles are being conveyed, for peripherally enclosing a space through which the plurality of articles are adapted to be conveyed along the predetermined axial path;

said tubular housing comprising a framework having a plurality of sides fixedly positioned with respect to each other, and a plurality of conveyor mechanisms rotatably mounted within each one of said plurality of sides of said framework so as to form, with said plurality of said sides of said framework, a plurality of side wall members wherein said plurality of side wall members are fixedly positioned with respect to each other, wherein said plurality of side wall members are fixedly positioned with respect to said longitudinal axis of said tubular housing, wherein said plurality of side wall members peripherally enclose said space through which the plurality of articles are adapted to be conveyed along the predetermined axial path, and wherein, depending upon the particular angular orientation of said tubular housing with respect to said longitudinal axis thereof, any one of said plurality of side wall members, comprising said plurality of conveyor mechanisms, can serve as a floor support member along which any one of the plurality of articles can be supported while being conveyed along the predetermined axial path; and means for angularly rotating said tubular housing around said longitudinal axis thereof so as to alter said angular orientation of said tubular housing with respect to said longitudinal axis thereof such that, if a particular one of the plurality of articles being conveyed through said tubular housing, as a result of being disposed upon said plurality of conveyor mechanisms forming one of said plurality of side wall members of said tubular housing serving as said floor support member for the particular one of the plurality of articles, has an improper orientation, another one of said plurality of side wall members of said tubular housing will be angularly moved to a position so as to subsequently serve as said floor support member for the particular one of the plurality of articles so that the particular one of the plurality of articles will now be disposed in a proper orientation.

2. The mechanism as set forth in claim 1, wherein:

said tubular housing has a substantially square-shaped configuration comprising four wall members angularly spaced 90° apart from each other; and said plurality of conveyor mechanisms are movably mounted within each one of said four wall members of said substantially square-shaped tubular housing such that each one of said four wall members of said substantially square-shaped tubular housing comprises a conveyor mechanism.

3. The mechanism as set forth in claim 2, wherein:

said plurality of conveyor mechanisms comprise roller conveyor mechanisms.

4. The mechanism as set forth in claim 3, wherein:

each one of said roller conveyor mechanisms comprises a plurality of conveyor rollers oriented transversely with respect to said longitudinal axis of said tubular housing so as to be capable of conveying each one of the plurality of articles along said longitudinal axis of said tubular housing.

5. The mechanism as set forth in claim 4, wherein:

each one of said plurality of conveyor rollers comprises an electrically powered conveyor roller; and said tubular housing has means disposed thereon for transmitting electrical power for driving said plurality of electrically powered conveyor rollers.

6. The mechanism as set forth in claim 5, wherein:

said means disposed upon said tubular housing for transmitting electrical power for driving said plurality of electrically powered conveyor rollers comprises commutator ring structure for operative cooperation with a commutator brush assembly.

7. An article conveyor system, for conveying a plurality of articles along a predetermined axial path so as to ensure that each one of the plurality of articles being conveyed along the predetermined axial path can attain a predeterminedly proper orientation, comprising:
  conveyor means for conveying a plurality of articles along a predetermined axial path;
  a tubular housing, defined around a longitudinal axis which is coaxially aligned with the axis defined by said predetermined axial path along which the plurality of articles are being conveyed, for peripherally enclosing a space through which the plurality of articles are adapted to be conveyed along said predetermined axial path;
  said tubular housing comprising a framework having a plurality of sides fixedly positioned with respect to each other, and a plurality of conveyor mechanisms rotatably mounted within each one of said plurality of sides of said framework so as to form, with said plurality of said sides of said framework, a plurality of side wall members wherein said plurality of side wall members are fixedly positioned with respect to each other, wherein said plurality of side wall members are fixedly positioned with respect to said longitudinal axis of said tubular housing, wherein said plurality of side wall members peripherally enclose said space through which the plurality of articles are adapted to be conveyed along said predetermined axial path, and wherein, depending upon the particular angular orientation of said tubular housing with respect to said longitudinal axis thereof, any one of said plurality of side wall members, comprising said plurality of conveyor mechanisms, can serve as a floor support member along which any one of the plurality of articles can be supported while being conveyed along said predetermined axial path; and
  means for angularly rotating said tubular housing around said longitudinal axis thereof so as to alter said angular orientation of said tubular housing with respect to said longitudinal axis thereof such that, if a particular one of the plurality of articles being conveyed through said tubular housing, as a result of being disposed upon said plurality of conveyor mechanisms forming one of said plurality of side wall members of said tubular housing serving as said floor support member for the particular one of the plurality of articles, has an improper orientation, another one of said plurality of side wall members of said tubular housing will be angularly moved to a position so as to subsequently serve as said floor support member for the particular one of the plurality of articles so that the particular one of the plurality of articles will now be disposed in a proper orientation.

8. The article conveyor system as set forth in claim 7, wherein:
  said tubular housing has a substantially square-shaped configuration comprising four wall members angularly spaced 90° apart from each other; and
  said plurality of conveyor mechanisms are movably mounted within each one of said four wall members of said substantially square-shaped tubular housing such that each one of said four wall members of said substantially square-shaped tubular housing comprises a conveyor mechanism.

9. The article conveyor system as set forth in claim 8, wherein:
  said plurality of conveyor mechanisms comprise roller conveyor mechanisms.

10. The article conveyor system as set forth in claim 9, wherein:
  each one of said roller conveyor mechanisms comprises a plurality of conveyor rollers oriented transversely with respect to said longitudinal axis of said tubular housing so as to be capable of conveying each one of the plurality of articles along said longitudinal axis of said tubular housing.

11. The article conveyor system as set forth in claim 10, wherein:
  each one of said plurality of conveyor rollers comprises at least one electrically powered conveyor roller; and
  means disposed upon said conveyor means and upon said tubular housing for transmitting electrical power for driving said plurality of electrically powered conveyor rollers.

12. The article conveyor system as set forth in claim 11, wherein:
  said means disposed upon said tubular housing for transmitting said electrical power for driving said plurality of electrically powered conveyor rollers comprises commutator ring structure; and
  said means disposed upon said conveyor means for transmitting said electrical power for driving said plurality of electrically powered conveyor rollers comprises a commutator brush assembly for operative cooperation with said commutator ring structure disposed upon said tubular housing.

13. The article conveyor system as set forth in claim 7, wherein:
  said means for rotating said tubular housing around said axis coaxially aligned with said predetermined axial path of said conveyor means comprises a drive motor for controlling the rotation of said tubular housing in accordance with any one of four modes of operation selected from a first mode of operation comprising a 90° angular rotation within a clockwise direction, a second mode of operation comprising a 90° angular rotation within a counter-clockwise direction, a third mode of operation comprising a 180° angular rotation, and a fourth mode of operation comprising 0° of angular rotation, depending upon the degree to which a particular one of the articles being conveyed along said predetermined axial path by said conveyor means is improperly oriented.

14. The article conveyor system as set forth in claim 13, wherein:
  said conveyor means comprises axially separated upstream and downstream conveyor sections; and
  said tubular housing is interposed between said axially separated upstream and downstream conveyor sections.

15. The article conveyor system as set forth in claim 14, further comprising:
  camera means disposed within the vicinity of said upstream conveyor section for determining the positional orientation of a particular one of the articles being conveyed along said predetermined axial path of said conveyor means, and if said camera means determines that the particular one of the articles being conveyed along said predetermined axial path of said conveyor means is improperly oriented, then said camera means can determine the degree to which the particular one of the articles being conveyed along said predetermined axial path of said conveyor means is improperly oriented.

16. The article conveyor system as set forth in claim 15, further comprising:

programmable logic controller (PLC) means, operatively connected to said drive motor and to said camera means, for actuating said drive motor so as to rotate said tubular housing in accordance with said one of said three modes of operation depending upon the degree to which the particular one of the articles being conveyed along said predetermined axial path of said conveyor means is improperly oriented as determined by said camera means, and for maintaining said drive motor deactuated if it is determined that the particular one of the articles being conveyed along said predetermined axial path of said conveyor means is properly oriented.

17. A method of conveying a plurality of articles along a predetermined axial path so as to ensure that each one of the plurality of articles being conveyed along the predetermined axial path can attain a predeterminedly proper orientation, comprising the steps of:

conveying a plurality of articles along a predetermined axial path of a conveyor;

forming a tubular housing around a longitudinal axis, which is coaxially aligned with said predetermined axial path of said conveyor, such that said tubular housing peripherally encloses a space through which the plurality of articles are adapted to be conveyed along said predetermined axial path of said conveyor, and said tubular housing comprises a framework having a plurality of sides fixedly positioned with respect to each other, and a plurality of conveyor mechanisms rotatably mounted within each one of said plurality of sides of said framework, so as to form, with said plurality of said sides of said framework, a plurality of side wall members wherein said plurality of side wall members are fixedly positioned with respect to each other, wherein said plurality of side wall members are fixedly positioned with respect to said longitudinal axis of said tubular housing, wherein said plurality of side wall members peripherally enclose said space through which the plurality of articles are adapted to be conveyed along said predetermined axial path, and wherein, depending upon the particular angular orientation of said tubular housing with respect to said longitudinal axis thereof, any one of said plurality of side wall members, comprising said plurality of conveyor mechanisms, can serve as a floor support member along which any one of the plurality of articles can be supported while being conveyed along said predetermined axial path; and angularly rotating said tubular housing around said longitudinal axis thereof so as to alter said angular orientation of said tubular housing with respect to said longitudinal axis thereof such that, if a particular one of the plurality of articles being conveyed through said tubular housing, as a result of being disposed upon said plurality of conveyor mechanisms forming one of said plurality of side wall members of said tubular housing serving as said floor support member for the particular one of the plurality of articles, has an improper orientation, another one of said plurality of side wall members of said tubular housing will be angularly moved to a position so as to subsequently serve as said floor support member for the particular one of the plurality of articles so that the particular one of the plurality of articles will now be disposed in a proper orientation.

18. The method as set forth in claim 17, further comprising the steps of:

providing said plurality of conveyor mechanisms as roller conveyor mechanisms comprising a plurality of electrically powered conveyor rollers; and orienting said plurality of roller conveyor mechanisms transversely with respect to said longitudinal axis of said tubular housing so as to be capable of conveying each one of the plurality of articles along said longitudinal axis of said tubular housing.

19. The method as set forth in claim 17, further comprising the steps of:

forming said housing as a tubular housing defined around said longitudinal axis coaxially aligned with said predetermined axial path of said conveyor so as to have a substantially square-shaped configuration comprising four wall members angularly spaced 90° apart from each other; and controlling the angular rotation of said tubular housing around said axis coaxially aligned with said predetermined axial path of said conveyor in accordance with any one of four modes of operation selected from a first mode of operation comprising a 90° angular rotation within a clock-wise direction, a second mode of operation comprising a 90° angular rotation within a counterclockwise direction, a third mode of operation comprising a 180° angular rotation, and a fourth mode of operation comprising 0° of angular rotation, depending upon the degree to which a particular one of the articles being conveyed along said predetermined axial path by said conveyor is improperly oriented.

20. The method as set forth in claim 19, further comprising the steps of:

providing a drive motor for rotating said tubular housing around said longitudinal axis;

providing a camera for determining the positional orientation of a particular one of the articles being conveyed along said predetermined axial path of said conveyor means, and if said camera means determines that the particular one of the articles being conveyed along said predetermined axial path of said conveyor means is improperly oriented, then said camera can determine the degree to which the particular one of the articles being conveyed along said predetermined axial path of said conveyor means is improperly oriented; and operatively connecting a programmable logic controller (PLC) to said drive motor and to said camera for actuating said drive motor so as to rotate said tubular housing in accordance with said one of said three modes of operation depending upon the degree to which the particular one of the articles being conveyed along said predetermined axial path of said conveyor means is improperly oriented as determined by said camera, and for maintaining said drive motor deactuated if it is determined that the particular one of the articles being conveyed along said predetermined axial path of said conveyor means is properly oriented.

* * * * *